Feb. 25, 1964
R. L. EASTON
3,122,741
DEVICE FOR DETECTING OBJECTS IN SPACE
Filed March 30, 1961
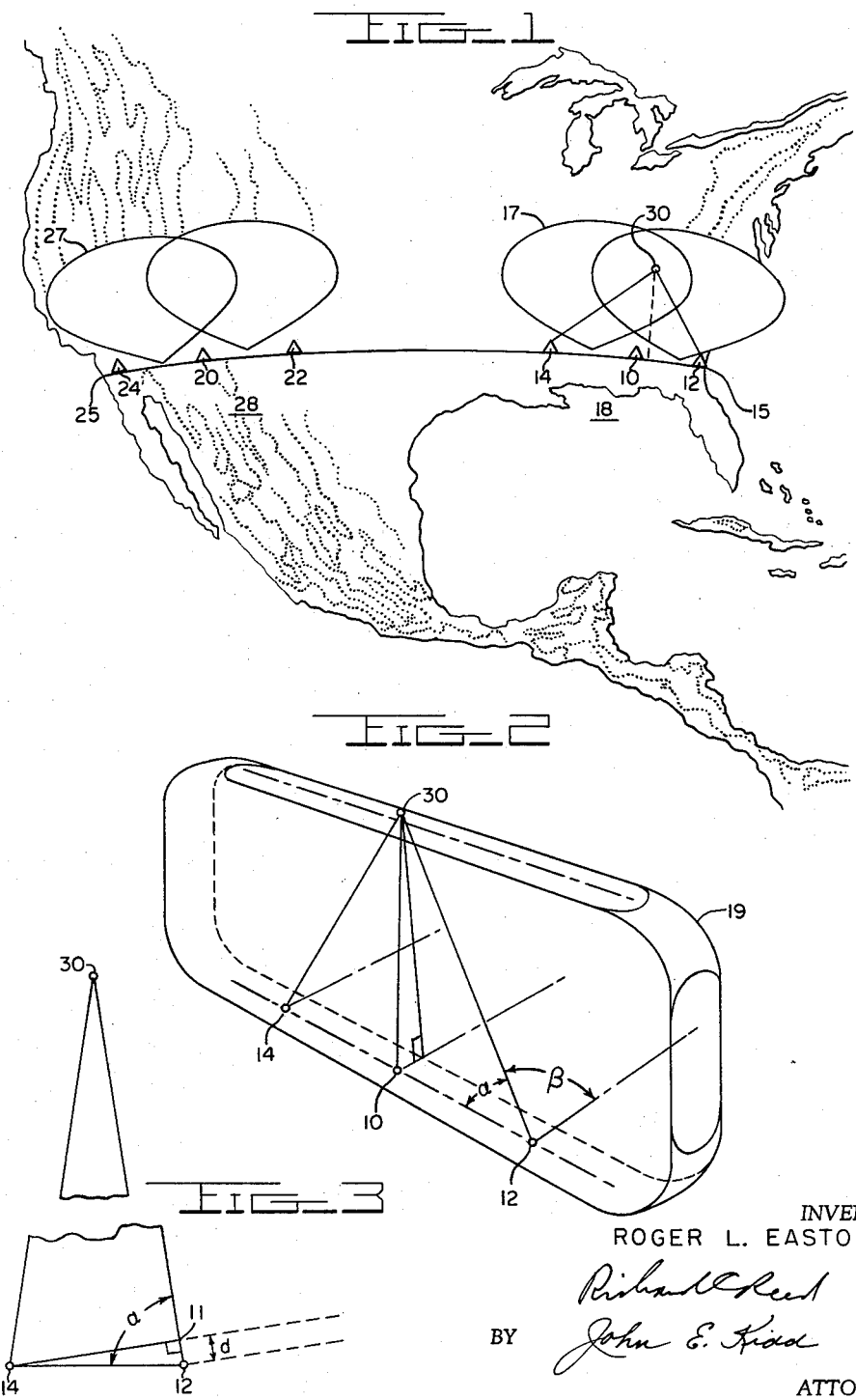
INVENTOR
ROGER L. EASTON
BY
ATTORNEYS 3,122,741
DEVICE FOR DETECTING OBJECTS IN SPACE
Roger L. Easton, Oxon Hill, Md., assignor to the United States of America as represented by the Secretary of the Navy
Filed Mar. 30, 1961, Ser. No. 99,637
1 Claim. (Cl. 343—15)
(Granted under Title 35, U.S. Code (1952), sec. 266)

The invention described herein may be manufactured and used by or for the Government of the United States of America for governmental purposes without the payment of any royalties thereon or therefor.

The present invention relates to an artificial earth satellite observation system and more particularly to a surveillance system capable of detecting and locating non-radiating objects in space.

There has long been a need for a relatively simple and reliable surveillance system for determining quickly and accurately the position of satellites orbiting in space. The problem of observing and tracking a satellite in space is made difficult by virtue of the high velocities obtained, the far-reaching altitudes that are possible and the relatively small size of the satellites. All of these factors create a very short observation time for an orbiting satellite and thus imply a detection system of great capabilities.

Further complicating the problem is that before the future orbital pattern of a satellite can be determined, its existence must be detected. If a satellite is radiating a signal, there are at present means available for observing and determining its orbit. Even satellites with such radiating transmitters cannot be relied upon for continued operation because of many reasons such as the impossibility of putting sufficient battery power in a satellite to last indefinitely. Further magnifying the problem there are noncooperating, unradiating and un-announced satellites such as completely passive extinct boosters and the like that are placed in space over which there is no control.

In the past, pulse radar systems have been developed for tracking aircraft and ships which have great maneuverability but low speeds. An 18,00 miles per hour satellite travels 30 times as fast as a 600 mile per hour aircraft. In addition to travelling at slower speeds, aircraft are larger and pas much closer to the detection device. The radar cross-sectional area of aircraft may be 1000 square feet while the area of a satellite may be less than 1 square foot. The range at which aircraft must be detected typically covers a range of 1 to 200 miles while for satellites it covers the range of 100 to 20,000 miles.

The difficulties with radar tracking of satellites is that the satellites operate at high velocity, are of small size and may be at a great distance way. To detect at a range of 20,000 miles without ambiguity, a pulse radar must use a maximum pulse rate of 5 p.p.s. To reflect sufficient energy to detect a nonradiating satellite, tremendous power and small antenna beams must be concentrated on the satellite. To generate and handle the high power transmission required, expensive components must be used. To concentrate the energy on the target the radar beam becomes so narrow as to require assistance in acquisition.

Other methods exist for tracking satellites; one is optical tracking and another is radio tracking. Optical tracking has many serious restrictions. It is limited by nature to short periods of twilight and further by weather conditions. In addition the photographic data is laborious to reduce and subject to confusion from meteorites. Radio tracking, while probably best embodied in the Minitrack system, is limited to use with satellites transmitting radio signals and fails to discriminate satisfactorily against meteorite signals.

I have found that the limitations imposed by the previous systems can be overcome and a fully reliable space surveillance system for detecting non-radiating satellites is possible. A radio reflection system is used so it will not be unduly limited by sunlight or weather. The transmitter is of the continuous wave type to permit generation of high average energy at modest cost. Large fixed antennas are used to provide high antenna gains. The antenna beams are fan-shaped to provide high gain and also to have a high probability of intercepting the satellite. The position of the reflecting object is then determined by observing the angle of arrival by interferometer techniques at two receiving stations.

Accordingly, it is an object of this invention to provide a detection system for locating non-radiating objects in space.

It is also an object of my invention to provide a space surveillance system capable of quickly providing approximate orbital elements of an orbiting satellite from a single pass of a satellite by a single detection device and to provide orbital elements of high accuracy after a single pass through two detection devices separated along the satellite's orbit.

It is a further object to provide a space surveillance system that will adequately discriminate against meteorite signals and transmitter leak-through while at the same time utilizing weak signals that previously were incapable of being processed.

It is also a further object of my invention to provide a space surveillance system capable of observing substantially all orbiting objects in space that pass through the system's fence, while at the same time determining accurately the cross-section and size of the satellite.

It is still another object of my invention to provide a detection system capable of observing substantially all unannounced, non-radiating or uncooperating satellites in space whose orbit or trajectory will pass over the United States and a system which cannot be jammed by means of a satellite carried transmitter.

Another object of my invention is to provide an artificial earth satellite observation system for use in cataloging both known and unknown satellites in space while at the same time having an extremely high signal-to-noise ratio, increased angular resolution and data collecting ability for establishing in real time an orbit for each satellite.

Other objects and features of this invention will become apparent to those skilled in the art as the disclosure is made in the following detailed description taken in connection with the accompanying drawings in which:

FIG. 1 is a pictorial illustration of the space surveillance system and the general arrangement of the transmitting and receiving sites.

FIG. 2 is a solid geometric configuration generally illustrating a sectional slice of a portion of the radiation fence and the angular resolution possible under a system embodying the principles of my invention.

FIG. 3 is a diagram of the phase angle determination at several receiver sites.

Briefly the space observation system is a detection and surveillance network consisting of several complexes, each complex comprising an integrated combination of transmitting and receiving sites. The receiving sites are separated by about 500 miles and a 50-kilowatt transmitter is located equidistance between the stations. The transmitter sends out a continuous wave (C.W.) of radio energy in a fan-shaped pattern very narrow in the north-south direction and very wide in the east-west direction.

The receiving stations have similar antenna patterns and all are coplanar with the transmitter pattern so that when a satellite enters the transmitting antenna pattern it is also entering the antenna pattern of the respective receiving sites. The two receivers then receive the reflected energy from the satellite as it crosses through the antenna patterns and measure the angle and direction from which the satellite reflections arrive at each receiving site.

Referring now to the drawings and in particular to FIG. 1, the surveillance system is pictorially illustrated showing the location of transmitting stations 10 and 20 and receiving stations 12, 14, 22 and 24. The areas which are capable of detection are shown as large fans over the stations. The receiving stations 12 and 14 and transmitter station 10 form an eastern complex 18 while the remaining transmitting and receiving sites 20, 22 and 24 form a western complex 28. While only two complexes have been shown, it is to be appreciated that the system is intended to include other complexes so that a radiation fence would extend from the east coast, point 15, to the west coast, point 25.

The data from all four receiving stations is received at a central operations center by transmission apparatus processing data in real time in relation to the instant the satellite traverses the common radiating pattern. The data is then either manually or automatically inserted into a computer such as the NORC, for orbital determination and satellite predictions. As the satellite 30 repeatedly crosses the fence, such as 17, in successive revolutions, the computer accumulates these observations and continually refines the orbital elements stored in the computer memory.

As the difference between the predicted passage and the observed passage decreases to an acceptable level, the computer will automatically begin storing observations and recompute the orbital elements or predictions only when the observed accumulated error drifts beyond the acceptable minimum.

The receiving system is composed of several identical antenna sites, such as sites 12 and 14, arranged to receive signals in the same plane so that all the antennas will cover exactly the same area. Each receiving site comprises an elongated row of dipole antennas radiating a pattern that is extremely wide in the E-plane and very narrow in the H-plane. The antenna field associated with the receiving sites is arranged in pairs of antennas with selected spacing to provide the desired degree of accuracy and eliminate ambiguity.

The transmitting antenna is not limited by antenna gain as are the receiving antennas. However, it has been found that it is preferable to keep the receiving and transmitting beamwidths equal and to improve the system by increasing the transmitter power. For this system to operate with the transmitter close to the receiver sites, special cancellation techniques can be used to reduce the level of feedthrough power to acceptable levels.

All detection devices that utilize a ground generated reflected signal are governed by the following equation:

$$\frac{P_r}{P_t} = \frac{G_1 G_2 \lambda^2 \sigma}{(4\pi)^3 R_1^2 R_2^2}$$

Where $P_r$ is the power received.
$P_t$ is the power transmitted.
$G_1$ is the gain of the transmitting antenna.
$G_2$ is the gain of the receiving antenna.
$\sigma$ is the effective reflecting area of the detected object.
$R_1$ is the distance from transmitter to object.
$R_2$ is the distance from receiver to object.
$\lambda$ is the wavelength of the frequency used.

Accordingly, the frequency should be kept as low as possible, but also limiting this frequency are the interrelated parameters of the minimum power requirements for receiver sensitivity and the practical available transmitting power. A frequency of 108 mc. has been found to provide practical results and still allow the use of antennas having a large capture area without the usually accompanying small beam widths. Since this system must have maximum range capabilities, a continuous wave (C.W.) transmitting system is employed because of the larger average power capable of being generated.

A major problem incurred by this system is transmission leak-through over the horizon due to tropospheric scattering. With such highly sensitive receiving antennas having 43 db or more of gain and high transmitter power, the signal in the direction of the ground plane in the wide beam coordinate must be kept as low as possible, otherwise the leakage between sites will produce spurious signals and interference. In view of this, it is desirable to keep the individual receiver sites isolated from the transmitter site by providing a very long separation between receiver and transmitting sites. All sites are separated by several hundred miles and preferably by mountain ranges so as to eliminate coupling between the transmitter site and the respective receiver sites.

The detection areas for this surveillance system are illustrated in FIG. 1 by fans 17 and 27, shown with respect to the stations that provide the coverage. In effect, a fence of radio energy from the transmitters 10 and 20, FIG. 1, is maintained so that whenever an object 30 enters the common pattern radiating from the respective sites, some of the energy reflected by the object will be picked up by the receiving sites, each receiving site antenna receiving essentially the same amplitude signal from each object that enters the detection area.

In FIG. 2, a sectional slice 19 of fan-shaped beam 17 is shown, illustrating the method employed to determine the angular position of a satellite 30 with respect to receiving site stations 12 and 14 when measuring angles alpha and beta by means of interferometers whereby the position of satellite 30 can be inferred by the point in the beam 17 defined by the intersection of the arrival angles at the two receiving sites.

The operation of the interferometer angle measuring, at each receiving site, is similar to that used in the Minitrack system of tracking, of known, radiating satellites. This technique of measuring an angle works on the principle of comparing the path length from the satellite to one receiving site to the path length from the same satellite to another receiving site.

Referring to FIG. 3, and assuming satellite 30 is traveling through section 19 of fan 17 and has been illuminated by transmitting site 10 in FIG. 2, and further assuming sites 12 and 14 have a baseline of 500 feet, the reflected energy from the satellite 30 will travel in a straight line. The path from satellite 30 to site 14 will be shorter than the path from satellite 30 to site 12, with the distance from satellite 30 to point 11 being that portion of the path from 30 to site 12 that is equal to the path from 30 to site 14. The reflected signal arrives at site 14 and point 11 in the same phase. The reflected signal arriving at site 12 will then lag in phase by an amount dependent upon the distance between point 11 and site 12. If the phase difference between the signals arriving at site 14 and site 12 is, as an example, 2610 degrees, then the distance between point 11 and site 12 (distance $d$) is 7¼ wavelengths. Since the wavelength of a 108 mc. wave is approximately 9.1 feet, then distance $d$ is calculated to be 66 feet. Angle $\alpha$ can be determined as follows:

$$\alpha = \arccos \frac{\text{distance } d}{\text{baseline}} = \arccos \frac{66}{500} = \arccos 0.1320$$

$$= 82.45 \text{ degrees (approximately)}$$

Actually, the phase measuring apparatus can measure only the difference in degrees that is an amount less than a whole wavelength. The measured angle in this case would be ¼ wavelength, or 90°. Because the length of baseline is large (approximately 55 wavelengths), an appreciable change in phase difference represents a small change in the direction angle of the satellite, thus providing a high degree of accuracy if the exact number of wavelengths is known. But the phase difference could be any combination of $360n° \pm 90°$, each indicative of a different direction angle of the satellite 30. The correct direction angle is determined by employing a system of pairs of antennas starting with a pair separated by less than ½ wavelength, providing a phase change of less than 360° on this short baseline. However, antennas only ½ wavelength apart would have serious coupling effects; but this can be avoided by using two pairs of antennas with long baselines which differ by approximately ½ wavelength. Now by comparing the measured phase angles of the two antenna pairs, the phase angle which would have been produced by antennas on the short baseline can be determined. The comparison is made by subtracting the measured phase angle of the shorter-base antenna pair from the measured phase angle of the longer-base antenna pair. Whenever the result is negative, the proper angle can be obtained merely by adding 360°. The determination of an angle with a ½ wavelength is so broad that it is necessary to use pairs of antennas with progressively longer baselines from the ½ wavelength beginning in order to arrive at the desired accuracy of angle measurement.

By the addition of appropriate sets of antennas, orthogonal to sites 12 and 14, a second directional cosine is measured, angle beta, thereby giving the complete angular position of satellite 30.

In addition to signals reflected from satellites, many other extraneous signals are present for limiting the performance of a space surveillance system. They appear as reflections from meteorite trails, from aircraft, and as direct signals from radiating satellites, electrical storms, radio stars, direct feedthrough from transmitter to receiver, and man-made interference, but the most prevalent interfering signals are due to metorities. By cross-polarizing the transmitting antenna at sites 10 and 20 in FIG. 1 and the receiving antennas at sites 12, 14, 22 and 24 the meteorite reflections can be held at a minimum. The reason for the reduction in meterorite reflection is understood when it is realized that the meteorite trails in general are formed below the ionosphere and that the most usual excitation of the meteorite trail is the one due to the individual electrons oscillating in the polarization of the exciting element. Since the excitation of the transmitting antennas 10 and 20 is not subject to Faraday rotation at the usual height of meteorite trails, the type of reflection described above will be cross-polarized to an antenna having a polarization that is crossed in respect to the transmitter. Under these conditions the response from meteorites can be expected to be low and past performance has shown that there is up to a 95% reduction in signals received from meteorites, the major cause of spurious signals in past systems. Reflections from satellites occur from within or above the ionosphere and the polarization of such signals is subject to Faraday rotation so that the polarization of the received signal can be expected to be random.

Thus I have provided a space surveillance system capable of efficiently detecting small objects at great distances. The advantage of measuring angles only is that a fixed antenna system can be built which will have extremely high accuracy. In addition, the information bandwidth of the reflection detection system is low so that the data can be transmitted on narrow bandwidths.

This system has proved ideal for a continental location; however, for island installations it would require suitably placed islands. Since this condition cannot always be met, a system still utilizing the detection capabilities of my present system but incorporating several modifications may be employed. For island installations, additional frequencies are transmitted at a power level slightly different from that of the detection transmitter. The frequencies are phase locked to the detection transmitter and the phase of the different frequencies are measured at the receiving site and compared to the phase of the reflected signals. A measure of range is thereby obtained and when coupled with the receiver site angle interferometer measurement, the reflecting satellite is located in space.

It should be understood that various modifications are contemplated and may obviously be resorted to by those skilled in the art without departing from the spirit and scope of this invention, as hereinafter defined by the appended claim.

What is claimed is:

Apparatus for determining the direction of small, fast moving objects at great distances, comprising, means for emitting a continuous wave signal in a substantially uniform amplitude fan-shaped beam substantially continuously covering all possible positions of said objects in a selected plane, first and second receiver means disposed on opposite sides of said means and substantially shielded from the means as a result of the curvature of the earth, said receiver means having broad angular response coordinated with the selected plane whereby energy reflected by objects located in the plane is received by both receivers, and means for comparing the phasing of the signals obtained at the receiver means.

References Cited in the file of this patent

UNITED STATES PATENTS

| | | |
|---|---|---|
| 2,420,408 | Behn | May 13, 1947 |
| 2,976,530 | Werner et al. | Mar. 21, 1961 |

OTHER REFERENCES

Mengel: "Tracking the Earth Satellite, and Data Transmission, by Radio" Proceedings of the I.R.E., volume 44, pp. 755–760, June 1956.